United States Patent [19]

Norrell

[11] 4,280,145
[45] Jul. 21, 1981

[54] NON-LINEAR, MULTI-SPEED, BI-DIRECTIONAL FACSIMILE SUBSCAN DRIVE CONTROL

[75] Inventor: Donald L. Norrell, Woodbury, Minn.

[73] Assignee: Minnesota Mining and Manufacturing Company, St. Paul, Minn.

[21] Appl. No.: 833,473

[22] Filed: Sep. 15, 1977

[51] Int. Cl.³ .............................................. H04N 1/06
[52] U.S. Cl. ............................... 358/289; 346/139 A; 358/285
[58] Field of Search ............... 358/285, 288, 289, 290; 346/139 R, 138, 139 A, 139 B, 139 D

[56] References Cited

U.S. PATENT DOCUMENTS

| | | | |
|---|---|---|---|
| 3,436,474 | 4/1969 | Saeger et al. | 358/288 |
| 3,441,946 | 4/1969 | Rudy | 346/139 R |
| 3,655,914 | 4/1972 | Gifft et al. | 346/139 A |
| 3,715,498 | 2/1973 | Haynes | 358/289 |
| 3,735,040 | 5/1973 | Punt et al. | 358/289 |
| 3,781,902 | 12/1973 | Shim et al. | 358/289 |
| 3,938,191 | 2/1976 | Jarmy | 358/289 |
| 4,028,732 | 6/1977 | Salter et al. | 358/289 |
| 4,041,454 | 8/1977 | Shepard et al. | 358/285 |

Primary Examiner—Joseph A. Orsino, Jr.
Attorney, Agent, or Firm—Cruzan Alexander; Donald M. Sell; Robert L. Marben

[57] ABSTRACT

A bi-directional subscan drive control for a drum-type facsimile machine utilizing a single, bi-directional, electrically controlled stepping motor for driving the scan head of the facsimile machine in one direction at any of a plurality of possible rates during a scanning operation and for driving the scan head in the opposite direction at a much higher rate upon completion of the scanning operation. The stepping motor is operated to provide at last two steps for each revolution of the drum when operated in the one direction.

6 Claims, 6 Drawing Figures

NON-LINEAR, MULTI-SPEED, BI-DIRECTIONAL FACSIMILE SUBSCAN DRIVE CONTROL

BACKGROUND OF THE INVENTION

1. Field of the Invention

The invention presented herein relates to bi-directional facsimile subscan drive controls for drum-type facsimile machines and more particularly to such controls using a single stepping motor electrically controlled for operation at any of several rates for moving the scan head in one direction during a scanning operation and at a much higher rate in the opposite direction for returning the scan head.

2. Description of the Prior Art

Drum-type facsimile machines use a drum on which the original or copy paper to be scanned is mounted. During a transmitting or receiving operation, the drum is rotated by one motor relative to a scan head to provide the main scan, while the scan head is driven axially of the drum in a continuous manner under the control of a second motor to provide the subscan for the machine. In this manner a helical scan is made of the material carried on the drum. Once the subscan, which is carried out at a relatively slow rate, has been completed, the scan head is usually automatically returned to its start position at a much higher rate to place the machine in condition for the next transmitting or receiving operation.

It is desirable that the return of the scan head be done automatically and before the operator normally has had time to remove the original or copy from the drum and secure another to the drum. Prior art facsimile machines have used tension devices, such as a spring, to provide the force for the return for the scan head. The tension device is arranged to be placed under tension as the subscan operation proceeds. The subscan drive is uncoupled from the scan head at the completion of the subscan allowing the tension device to return the scan head to the desired starting point for the next operation of the machine. Other prior art machines have used a separate drive mechanism which is engaged for returning the scan head at the completion of the subscan. U.S. Pat. No. 3,764,741 to John H. Long and U.S. Pat. No. 3,927,256 to Sakae Fujimoto are examples of the prior art arrangements that have been described.

The subscan drives of the prior art require special clutching arrangements which are subject to failure and spring type return mechanisms are known to present service problems.

SUMMARY OF THE INVENTION

This invention provides a bi-directional facsimile subscan drive control that can be operated at a plurality of desired subscan speeds and provides for the rapid return of the scan head. A single, bi-directional permanent magnet synchronous motor is operated as a stepping motor to provide the driving force needed at the various subscan speeds and for the return of the scan head to the start position. This, unlike the prior art, is accomplished without the use of any clutches or the use of different gearing for different speeds. The invention permits the use of a suitable return speed for the scan head while still providing for a sufficient number of steps for each scan for the production of an acceptable copy. Further, the stepping motor can be operated at the various required speeds so the number of steps of the motor provided for each revolution of the drum is close to or equal to an integer which improves the quality of the copy that is produced.

The different frequency signals needed for operation of the subscan motor at the various speeds are obtained from a microprocessor and are used to control motor drive circuits for the motor. The microprocessor is available for carrying out other processes required for operation of the facsimile machine serving to reduce the cost assignable to the subscan drive control.

The economy involved by the use of a single motor drive without the need for clutches for the subscan drive is readily apparent. In addition, the invention permits the use of relatively inexpensive, commercially available permanent magnet synchronous motors serving to further reduce the cost for a subscan drive control.

DESCRIPTION OF THE DRAWINGS

The invention will be better understood from the following description considered in connection with the accompanying drawings in which an embodiment of the invention is illustrated by way of example. It is to be expressly understood that the drawings are for purposes of illustration and description only and are not intended as a definition of the limits of the invention.

DETAILED DESCRIPTION

Figure 1:
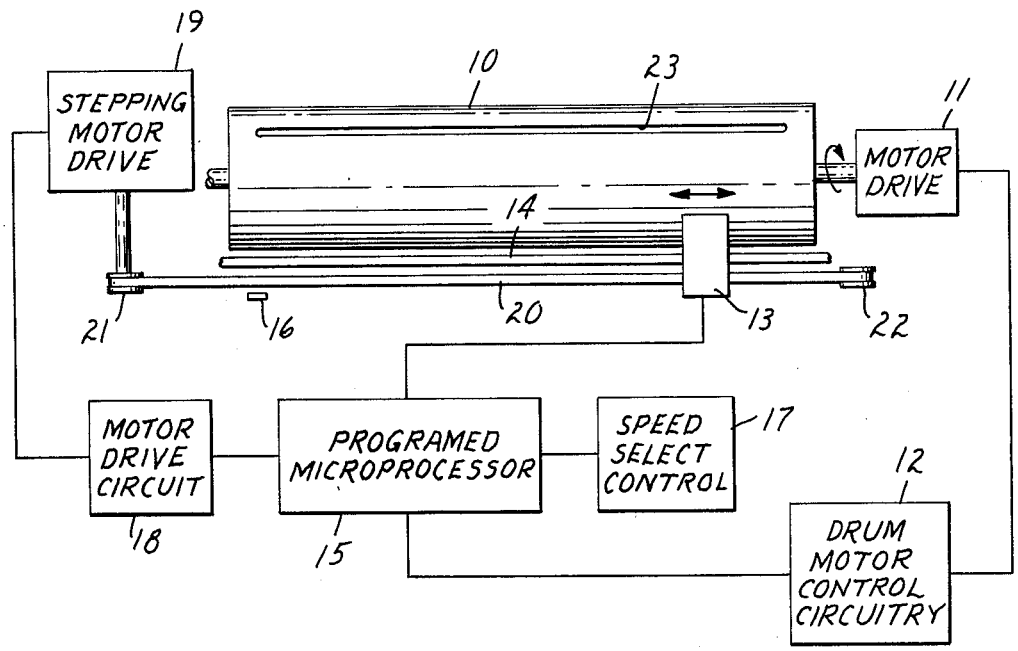
FIG. 1 is a diagrammatic showing of an embodiment of the invention.

The facsimile subscan drive control of this invention is diagrammatically shown in FIG. 1. A drum-type facsimile machine is diagrammatically shown in FIG. 1 to the extent needed to describe the invention. The machine includes a drum 10, a drum motor drive 11, drum motor control circuitry 12, a scan head 13, a scan head guide rod 14, a programmed microprocessor 15 and a portion of an end of scan detector 16. The subscan drive control includes a speed select control 17, the microprocessor 15, a motor drive circuit 18, a stepping motor drive 19 and a scan head belt 20 mounted on two pulleys 21 and 22.

The drum 10 includes means for securing an original document or copy paper to the drum which can take any number of well known forms. The sheet material can, for example, be clamped along an edge portion to the outer surface or pass through a slot in the drum and be clamped to the inner surface of the drum. The drum 10 is shown with a slot 23 to indicate the use of a clamping arrangement (not shown) for securing an edge portion of the document or copy paper to the inner surface of the drum.

The drum 10 is connected to the drum motor drive 11 which will normally include a motor plus appropriate gearing for driving the drum 10 for rotation about its axis. Since a microprocessor 15 is used for controlling the operation of the facsimile machine, it is convenient to also use it for providing the required signals to the drum control circuitry 12 for driving the drum motor drive 11 at the desired speed.

The main scan of a sheet material carried on the drum 10 is provided by the rotation of the drum which carries the sheet material past the scan head 13. By moving the scan head 13 along the guide rod 14 axially of the drum, a subscan of the sheet material is provided. The movement of the scan head 13, as will be explained, is carried out in a stepwise fashion as the drum 10 is rotated to provide a helical stepped scan of the sheet material.

The stepping motor drive 19, which may be a reversible, permanent magnet synchronous motor together with appropriate gearing, is connected to drive pulley 21 to move the scan head belt 20 at speeds determined by stepping signals supplied from the microprocessor 15 to the motor drive circuit 18 which is connected to provide drive signals to motor drive 19. The scan head 13 is secured to the belt 20 for movement with the belt and along the guide rod 14. The pulley 22 functions as an idler pulley. The scan head supplies a signal to the microprocessor when the scan head reaches the end of a subscan. Such a signal may be produced by the use of a Hall effect detector circuit which serves to detect the end of scan detector 16, e.g., a magnet, at the time the scan head reaches the end of a subscan. The end of scan detector 16 may take on other forms such as a simple microswitch which is located for operation by the scan head when it reaches the end of a subscan. The microprocessor 15 is arranged so the end of scan signal causes the microprocessor to provide signals to the motor drive circuit 18 to reverse the direction of operation of the stepping motor drive 19 and have it operate at a speed which is much greater than its speed of operation during a scan operation.

The rate at which the stepping motor drive 19 is operated during a scan is determined by the speed selection made at the speed selection control 17 which is connected to the microprocessor 15. The microprocessor provides stepping signals to the motor drive circuit 18 at a frequency determined by the selection made at the control 17.

Further details of the subscan drive control of this invention can be best understood when consideration is given to actual requirements for a drum-type facsimile machine.

If a synchronous permanent magnet motor drive is to be used for the stepping motor drive 19, it can be operated to have either 4 or 8 steps per cycle. It is desirable to use 8 steps/cycle during a scan, since the movement per step during the subscan will be less than the movement per step for 4 steps/cycle to cause the subscan to more nearly approximate a linear subscan. The necessary distance for return of the scan head of the facsimile machine is selected to be 11.5 inches or 11.5×2.54 centimeters. If 8 steps/cycle could be used for returning the scan head when using a 60 Hz drive signal, the number of steps the motor drive 19 would provide per inch or centimeter of return in terms of $t_r$, the time for return (seconds), can then be expressed as follows:

$$\text{Steps/inch} = \frac{t_r \times 480}{11.5} \text{ or Steps/cm.} = \frac{t_r \times 480}{11.5 \times 2.54}$$

It is desirable that an integral number of steps be provided for each scan line (revolution of the drum) since each step of the motor drive 19 for a revolution of the drum will then occur at the same point in a revolution during each subsequent revolution of the drum which serves to provide a copy for black areas which will be uniform in appearance. If the steps are offset too much from one another from one scan line to the next, objectionable white areas can appear in areas of the copy which should be solid black.

Standard scan resolutions for facsimile are 64 lines/inch and 96 lines/inch or 64/2.54 lines/cm. and 96/2.54 lines/cm. With an integral number of steps for each revolution of the drum a desirable goal, the number (N) of integral steps per line for the 96 lines/inch resolution is then determined by dividing the expression for the steps/inch by 96 lines/inch, i.e., $$N = \frac{t_r \times 480}{11.5 \times 96}$$

Similarly, the number (M) of integral steps per line for 64 lines/inch resolution is given by the expression, $$M = \frac{t_r \times 480}{11.5 \times 64}$$

Selecting various integers for N and calculating $t_r$ and M, the following selections are possible when the motor drive is operated using 8 steps per cycle:

| N | 2 | 4 | 6 | 8 | 10 | 12 | 14 |
|---|---|---|---|---|----|----|----|
| $t_r$ | 4.6 | 9.2 | 13.8 | 18.4 | 23 | 27.6 | 32.2 |
| M | 3 | 6 | 9 | 12 | 15 | 18 | 21 |

While it is desirable that a large number of steps/line be used during a scan, since the scan becomes more linear as the steps/line increases, it is apparent, from the return times that have been calculated, that there is a limit to the time that can be used for the return of the scan head, if the facsimile machine is to be used efficiently.

Selecting twenty-three seconds as an acceptable time for return of the scan head, the requirements for the motor drive 19 and the drive pulley 21 can be established. Motor drives having permanent magnet synchronous motors which operate at 300 rpm with 7.5 degrees per step when operated at 4 steps/cycle or 3.75 degrees per step when operated at 8 steps/cycle are commercially available with any of a large number of gear ratios. As has been indicated, 240 steps per second will be provided when operating the motor at 60 Hz with four steps per cycle. This mode of operation is used to return the scan head at a fast rate, so a total of 5520 steps will occur during the twenty-three seconds required for return of the scan head. This covers a distance of 11.5 inches, so the distance per step is 0.0021 inches or 2.54×0.0021 cm. This distance per step can be expressed in terms of the degrees per step (7.5°), the gear ratio (G) of the motor drive 19 and the diameter in inches (d) of the drive pulley 21 as follows:

$$\frac{7.5°}{360°} \times G \times \pi d = .0021 \text{ inches}$$

It is desirable that the drive pulley be reasonably small to keep the scan head drive compact. Selecting a standard 32 tooth pulley with a 0.832 inch or 0.832×2.54 cm. pitch diameter, G is then 0.0386 as determined from the above equation. A 300 rpm, 60 Hz permanent magnet synchronous motor drive that has a gear ratio of 0.0384 to provide an output of 11.52 rpm, which is available as a standard motor drive, comes very close to providing the calculated gear ratio of 0.0386 and would be suitable. Of course, an exact integral number of steps for each revolution of the drum can be attained by having a specially geared motor drive manufactured or use the above-mentioned motor drive having the 0.0384 gear ratio and have a non-standard pulley with a diameter of 0.875 inches or 0.875×2.54 cm. manufactured. The standard motor drive and standard drive pulley mentioned will provide 14.944 and 9.963 steps per revolution for the 96 lines per inch and 64 lines per inch resolution scans, respectively, which is very close to the desired 15 and 10 steps for each scan line at 96 lines/scan and 64 lines/scan, respectively, with twenty-three seconds scan head return time.

While the foregoing explanation shows how a scan head return time of twenty-three seconds can be obtained, no mention has been made of the time a scan will be completed which, of course, is dependent on the frequency of the forward or subscan control signals used to operate the motor drive 19. As has been indicated, scan resolutions of 96 lines/inch and 64 lines/inch, respectively, have been established as standard resolutions. In addition, drum speeds of 180 rpm and 360 rpm are standard speeds. If the drum is operated at 180 rpm, 3 scan lines per second will be provided which for the 96 lines/inch resolution will provide 10 steps per line, if an integral number of steps are provided, or 30 steps/second when 8 steps per cycle are used when driving the drive motor 19. This requires a frequency of 30/8 or 3.75 Hz for operation of the motor drive 19. This will provide a copy scan of 11.5 inches in about 6 minutes. If the drum is operated at 360 rpm, the frequency would have to be doubled to 7.5 Hz to have 10 steps per line. In this case, time for a copy scan of 11.5 inches is about 3 minutes. Similarly, when the drum is operated at 180 rpm with a resolution of 64 lines/inch to be provided, 15 steps per scan line or 45 steps per second are used, if an integral number of steps are to be used when driving the drive motor 19. This requires a frequency of 45/8 or 5.625 Hz. This will provide a copy scan of 11.5 inches in about 4 minutes. If the drum is then operated at 360 rpm, the frequency would have to be doubled to 11.25 Hz to provide the 15 steps per line, in which case only 2 minutes are needed for scanning 11.5 inches.

The various forward or subscan control signal frequencies that can be used to provide the various copy speeds can be obtained from the programmed microprocessor 15 which is connected to drive the motor drive circuit 18. A selection switch 17 is provided which allows the operator to select the copy speed desired which causes the microprocessor 15 to provide signals to the motor drive circuit 18 of the proper frequency for the selected speed and also provide the drum motor control circuitry 12 with signals of the proper frequency to operate the drum motor drive 11 at the required 180 or 360 rpm.

Figure 2:
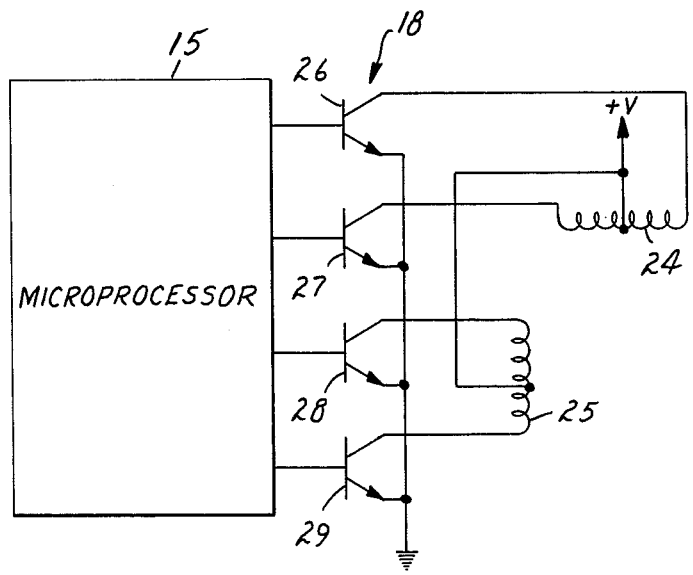
FIG. 2 is a schematic showing of a portion of circuitry included in FIG. 1.
Figure 3:
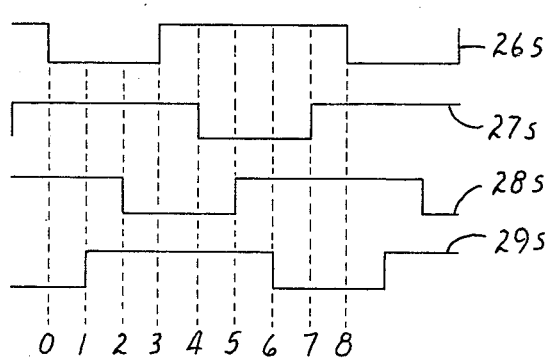
FIG. 3 depicts signals used for a time when operating the circuitry of FIG. 2.
Figure 4:
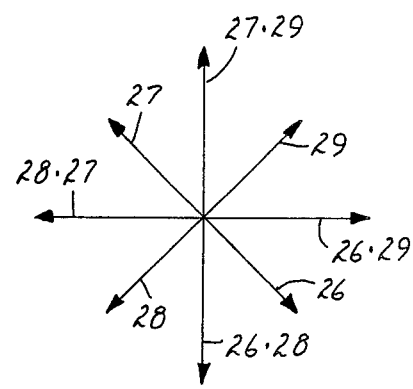
FIG. 4 shows torque vectors related to the circuitry of FIG. 2 using the signals of FIG. 3.

A suitable motor drive circuit 18 is shown in FIG. 2. It is shown connected to the two windings 24 and 25 for the motor drive 19. The drive circuit includes four NPN transistors 26–29, inclusive, each of which have their base electrodes connected to the microprocessor 15. The emitter electrodes are all connected to ground. The collector electrodes of transistors 28 and 29 are connected to opposite ends of the winding 25. Transistors 26 and 27 are similarly connected to the winding 24. The centers of the windings 24 and 25 are connected to a positive voltage. This arrangement causes the motor drive 19 to receive stepping signals eight times every cycle when signals for the various transistors, all of the same frequency, are provided from the microprocessor 15 to provide the subscan operation of the motor drive 19. Referring to FIG. 3, signals present at the collectors of the various transistors are shown. The same reference numeral used for a transistor in FIG. 2 is used to identify the collector signal for that transistor with a small "s" added to the reference numeral. When a transistor conducts, the signal at the collector for the transistor is low. As indicated by the signals shown in FIG. 3, each transistor conducts for $\frac{5}{8}$ of each cycle. Using signal 25s as reference, signal 27s lags the signal 26s by $\frac{1}{2}$ cycle, signal 28s lags 26s by $\frac{1}{4}$ cycle and signal 29s lags 26s by $\frac{3}{4}$ cycle. FIG. 4 shows the eight torque vectors that are provided by this arrangement. The torque vectors are identified by the reference numerals for the transistors that conduct to provide a particular torque vector.

When the scan head is to be returned to the start position after a scan is completed, the microprocessor receives a signal that is produced in response to detection of the end of scan detector 16 to cause the microprocessor to provide reverse control signals at 60 Hz which are applied to the transistors 26–29 of the motor drive circuit 18 to provide stepping signals to the motor drive 19 to cause it to reverse direction and operate at its top rated speed to return the scan head to the start position. While not shown, a start of scan detector similar to the detector 16 is provided for the generation of a signal for the microprocessor to stop the motor drive 19.

Figure 5:
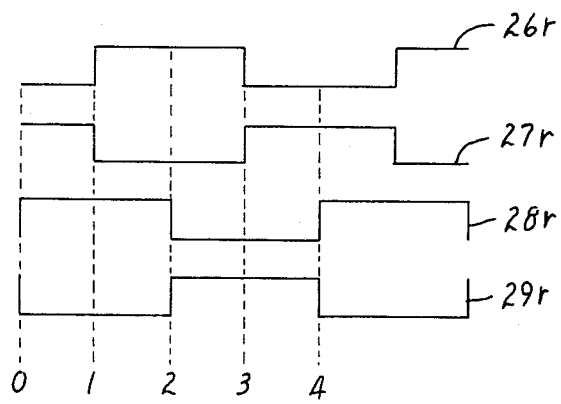
FIG. 5 depicts signals used for a time when operating the circuitry of FIG. 2.
Figure 6:
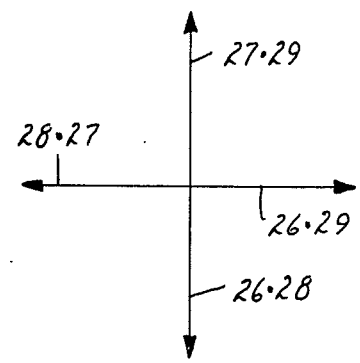
FIG. 6 shows torque vectors related to the circuitry of FIG. 2 using the signals of FIG. 5.

FIG. 5 shows signals representative of the signals at the collectors of the transistors when reverse control signals are provided by the microprocessor to cause the motor drive 19 to be stepped four times every cycle in a reverse direction to return the scan head. The same reference numeral used for a transistor in FIG. 2 is used in FIG. 5 to identify the signals for that transistor with a small "r" added to the reference numeral. As before, when a transistor conducts, the signal at the collector for the transistor is low, but in this case, each transistor conducts for $\frac{1}{2}$ of each cycle. The phase relationships provided by the signals as shown in FIG. 5 cause the four torque vectors shown in FIG. 6 to be provided. As in the case of FIG. 4, the torque vectors are identified by the reference numerals for the transistors that conduct to provide a particular torque vector.

While one embodiment has been described in detail, it is appreciated that this was for the purpose of illustration and that additional embodiments can be made without departing from the spirit and scope of the invention as set forth in the appended claims.

What is claimed is:

1. A bi-directional, multi-speed, facsimile subscan drive control for the scan head of a drum-type facsimile machine which provides a scan operation by rotation of the drum with movement of the scan head axially of the drum including:
    a single stepping motor drive having a rated operating frequency;
    means for selectively and continuously providing forward control signals during a scan operation at any one of a plurality of frequencies all of which are less than said rated frequency and providing reverse control signals upon completion of a scan operation at a frequency that is higher than any of the forward control signals;

a motor drive circuit connected to said means for receiving said control signals and in response thereto providing motor drive stepping signals with said stepping motor drive connected to said motor drive circuit for receiving said motor drive stepping signals to step said motor drive; and means operatively connecting said motor drive to the scan head of the facsimile machine for moving the scan head in response to operation of said motor drive whereby a helical stepped scan is produced when said forward control signals are provided and said scan head is moved toward its starting position when said reverse control signals are provided and wherein said forward control signals at any of said plurality of frequencies cause said motor drive circuit to provide said motor drive stepping signals at a rate for stepping said motor drive at least twice during each revolution of the drum during a scan operation with each of said stepping signals provided during a revolution of the drum occurring essentially at the same point as the corresponding stepping signals for the preceding revolution of the drum.

2. The facsimile subscan drive control of claim 1 wherein said means for providing control signals includes a programmed microprocessor.

3. The facsimile subscan drive control of claim 1 wherein said single stepping motor drive includes a permanent magnet synchronous motor.

4. The facsimile subscan drive control of claim 1 wherein said means connecting said motor drive to the scan head includes a drive pulley connected directly to said motor drive, an idler pulley, and a belt carried on said drive pulley and said idler pulley, said scan head secured to said belt for movement with said belt.

5. A bi-directional, multi-speed, facsimile subscan drive control for the scan head of a drum-type facsimile machine which provides a scan operation by rotation of the drum with movement of the scan head axially of the drum including:

a single stepping motor drive having a rated operating frequency and adapted for operation to step S steps per cycle and less than S steps per cycle, where S is an integer;

means for selectively and continuously providing forward control signals during a scan operation at any one of a plurality of frequencies all of which are less than said rated frequency and providing reverse control signals upon completion of a scan operation at a frequency that is higher than any of the forward control signals;

a motor drive circuit connected to said means for receiving said control signals and in response to said forward control signals providing motor drive stepping signals at the rate of S steps per cycle and in response to said reverse control signals providing motor drive stepping signals at a rate less than S steps per cycle with said stepping motor drive connected to said motor drive circuit for receiving said motor drive stepping signals to step said motor drive; and means operatively connecting said motor drive to the scan head of the facsimile machine for moving the scan head in response to operation of said motor drive whereby a helical stepped scan is produced when said forward controls are provided and said scan head is moved toward its starting position when said reverse control signals are provided.

6. A bi-directional, multi-speed, facsimile subscan drive control for the scan head of a drum-type facsimile machine which provides a scan operation by rotation of the drum with movement of the scan head axially of the drum including:

a single stepping motor drive having a rated operating frequency and adapted for operation to step S steps per cycle and less than S steps per cycle, where S is an integer;

means for selectively and continuously providing forward control signals during a scan operation at any one of a plurality of frequencies all of which are less than said rated frequency and providing reverse control signals upon completion of a scan operation at a frequency that is higher than any of the forward control signals;

a motor drive circuit connected to said means for receiving said control signals and in response to said forward control signals providing motor drive stepping signals at the rate of S steps per cycle and in response to said reverse control signals providing motor drive stepping signals at a rate less than S steps per cycle with said stepping motor drive connected to said motor drive circuit for receiving said motor drive stepping signals to step said motor drive; and means operatively connecting said motor drive to the scan head of the facsimile machine for moving the scan head in response to operation of said motor drive whereby a helical stepped scan is produced when said forward controls are provided and said scan head is moved toward its starting position when said reverse control signals are provided and wherein said forward control signals at any of said plurality of frequencies cause said motor drive circuit to provide said motor drive stepping signals at a rate for stepping said motor drive at least twice during each revolution of the drum during a scan operation with each of said stepping signals provided during a revolution of the drum occurring essentially at the same point as the corresponding stepping signals for the preceding revolution of the drum.

* * * * *